April 17, 1928.                                              1,666,655
G. F. HOCHRIEM
WEIGHT ADJUSTING MECHANISM FOR WEIGHING SCALES
Filed Jan. 5, 1926
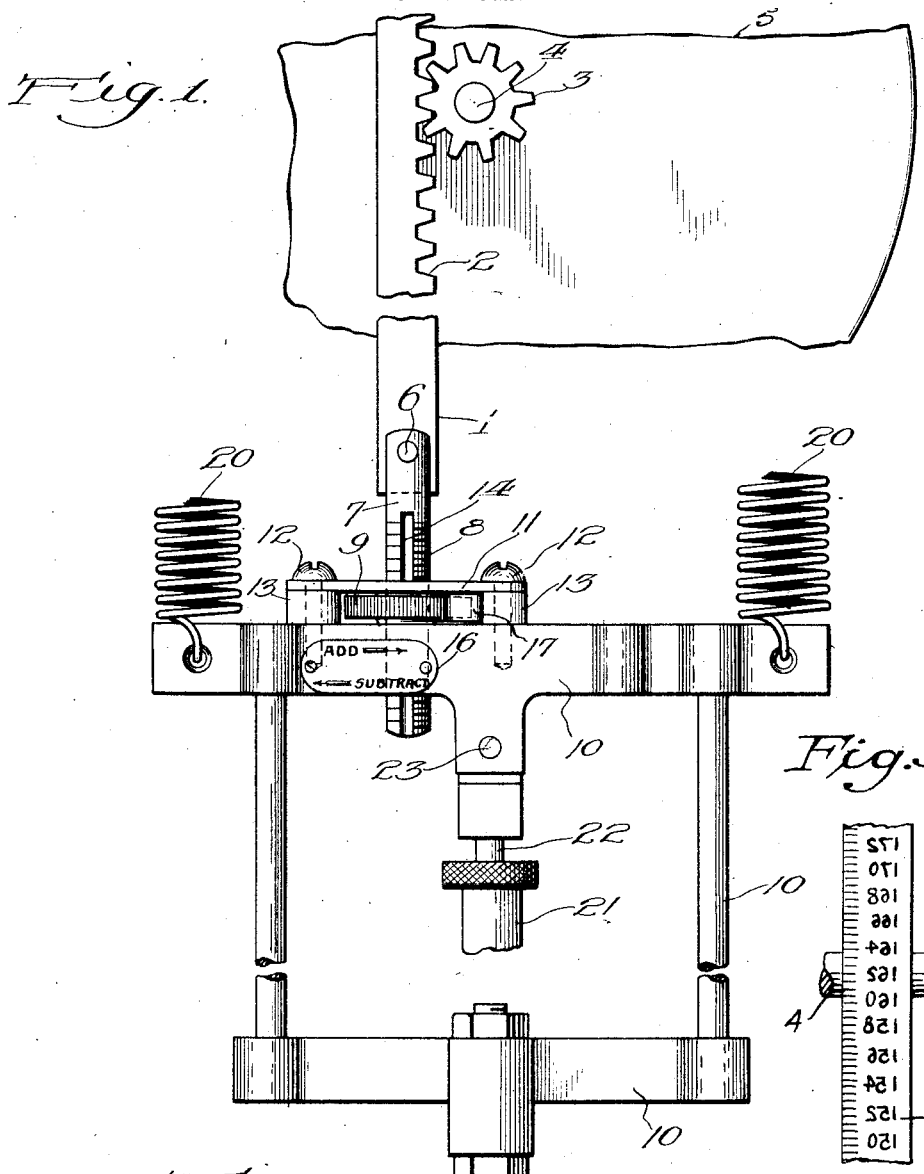
Witness:
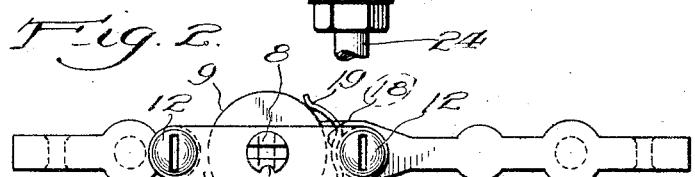
Inventor:
Gustav F. Hochriem,
by Frank L. Belknap
Atty.

Patented Apr. 17, 1928.

1,666,655

UNITED STATES PATENT OFFICE.

GUSTAV F. HOCHRIEM, OF CHICAGO, ILLINOIS, ASSIGNOR TO RHODES-HOCHRIEM MANUFACTURING CO., OF CHICAGO, ILLINOIS, A CORPORATION OF ILLINOIS.

WEIGHT-ADJUSTING MECHANISM FOR WEIGHING SCALES.

Application filed January 5, 1926. Serial No. 79,325.

This invention relates to weight adjusting mechanisms for weighing scales, and refers more particularly to an adjustable device which can be easily manipulated to center or adjust the weight recording mechanism of the scale in order that such weight recording mechanism will always be accurate.

The advantages of the present invention reside in its simplicity, economy in manufacture, ease in assembly and manipulation, and efficiency in actual operation.

In the drawings, Fig. 1 is an enlarged diagrammatic view of the device with certain parts broken away, illustrating the invention. Fig. 2 is a top plan view of the frame or support for the mechanism. Fig. 3 is a fragmentary edge view showing the type on the printed disk.

Referring more particularly to the drawings, 1 designates a rack bar positioned in a vertical plane and provided with teeth 2 adapted to engage the teeth of a pinion gear 3 mounted on a stub shaft 4. In the particular embodiment of the present invention, the shaft 4 also has keyed thereon a weight recording wheel 5 which in the present instance, is a weight printing wheel having printing characters on its periphery. It is obvious however, that the invention is applicable to any type of weight recording scale now in use of the rack bar and pinion type.

The lower end of the rack bar 1 may be pivotally connected as shown at 6, to a pin 7, which pin is externally screw threaded on its lower end as shown at 8. This externally screw threaded portion 8 is adapted to register with an internal screw thread on the knurled disk 9. The disk is held between the steelyard frame 10 and a flat plate 11, which latter is held in fixed spaced relation to the steelyard frame 10 by means of the screws 12 and spacing sleeves 13, said flat plate 11 being apertured adjacent both ends to accommodate the pin end of the screws 12, and the top of the steelyard frame being internally screw threaded to register with the lower end of the pin of the screw 12.

In the drawings, the knurled disk 9 is shown as mounted in the space between the flat plate 11 and top of the steelyard frame 10 with a space between its upper and lower surfaces. This space has been shown for the sake of clearness, but in practice, there is substantially no space between the surfaces of the knurled disk 9 and the surfaces of the steelyard frame 10 and flat plate 11. The knurled disk 9 may be enlarged in cross sectional thickness adjacent the screw threaded aperture registering with the screw threads 8, if desired.

As one of the features of the invention, to prevent accidental rotation of the pin 7, and also to act as a guide therefor, said pin 7 is provided with a longitudinal slot 14 adapted to register with the inwardly extending stud 15. A plate 16 may be mounted on the steelyard frame 10 having arrows and containing instructions as to the direction of rotation of the knurled disk 9 for the purpose of adding or subtracting in order to balance the weight recording element 5. It is obvious that the knurled disk 9 is adapted to be manually rotated.

As another feature of the present invention, in order to lock the knurled disk 9 in position after it has been rotated, so that the weight recording element 5 is accurate, I may provide a blade spring 17 bowed inwardly at its center 18 as shown, and curving outwardly as shown at 19, the rounded faces of the extensions 19 being adapted to register with the grooves of the knurled surface of the disk 9. The contacting spring pressure exerted by the said blade spring 17 is sufficient to prevent accidental rotation of the knurled disk 9, but is not sufficient to constitute any substantial resistance to the manual rotation of said disk.

To opposite sides of the steelyard frame 10 may be attached the coil springs 20 which at their upper ends are anchored in a suitable support, for instance, the frame of the scale.

A shock absorbing dash pot or similar mechanism is shown diagrammatically at 21 with a rod 22 attached to the steelyard frame being pivoted at 23. The steelyard rod 24 extends downwardly from the base of the steelyard frame being attached to mechanism in the base which is actuated by a weight being placed on the scale. It was not thought necessary to encumber the drawings with detailed showings of various elements which do not form part of the present invention, and these parts have only been diagrammatically shown.

The operation of the device should be apparent from the foregoing description. Assume that the entire mechanism has been assembled and it is being tested in the factory as to accuracy of recording. A standard weight of say fifty pounds is placed on the platform of the scale which actuates the mechanism to place the recording element 5 in position to record the fifty pounds. Assume that the weight recorded is only forty-eight pounds. It is then necessary to manually rotate the knurled disk 9 in the direction of the arrow to add the necessary two pounds. This rotation of the knurled disk 9 to the right causes the pin 7 and rack bar 1 to be drawn downwardly a slight distance, and the intermeshing of the pinion gear 3 with the teeth 2 causes it to rotate the recording element 5 to a position at which an even fifty pounds will be recorded.

If the weight recorded by the element 5 is in excess of the actual weight, the knurled disk is rotated in the opposite direction, namely to the left to subtract the excess and cause the recording element 5 to record the correct weight.

I claim as my invention:

1. In combination, a rack bar and pinion gear, a weight recording element movable with said pinion gear, a pin connected with said rack bar, a manually operated means registering with said pin for raising or lowering said rack bar to change its point of registration with said gear, and in turn regulating the weight recorded by said recording element, a spring tensioned element contacting said manually operated means for maintaining the latter in fixed position subsequent to manipulation.

2. In combination, a rack bar and pinion gear, a weight recording element movable with said pinion gear, a pin connected with said rack bar, a manually operated means registering with said pin for raising or lowering said rack bar to change its point of registration with said gear, and in turn regulating the weight recorded by said recording element, a projecting stud, a longitudinal recess in said pin, adapted to engage a projecting stud to prevent unintentional movement of said pin, and to act as a guide for said manually operated means.

3. In combination, a rack bar and pinion gear, a weight recording element movable with said pinion gear, a pin connected with said rack bar, a manually operated means registering with said pin for raising or lowering said rack bar to change its point of registration with said gear, and in turn regulating the weight recorded by said recording element, a projecting stud, a longitudinal recess in said pin, adapted to engage a projecting stud to prevent unintentional movement of said pin, and to act as a guide for said manually operated means, and a spring tensioned element contacting said manually operated means for maintaining the latter in fixed position subsequent to manipulation.

GUSTAV F. HOCHRIEM.